(12) United States Patent
Guo et al.

(10) Patent No.: US 11,279,841 B2
(45) Date of Patent: Mar. 22, 2022

(54) FLUID SETS

(71) Applicant: Hewlett-Packard Development Company, L.P., Spring, TX (US)

(72) Inventors: Dennis Z. Guo, San Diego, CA (US);
Jie Zheng, San Diego, CA (US); David Michael Ingle, San Diego, CA (US);
Ronald A. Askeland, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 29 days.

(21) Appl. No.: 16/769,773

(22) PCT Filed: Apr. 16, 2018

(86) PCT No.: PCT/US2018/027755
§ 371 (c)(1),
(2) Date: Jun. 4, 2020

(87) PCT Pub. No.: WO2019/203784
PCT Pub. Date: Oct. 24, 2019

(65) Prior Publication Data
US 2020/0308437 A1    Oct. 1, 2020

(51) Int. Cl.
*C09D 11/54* (2014.01)
*B41J 3/407* (2006.01)
(Continued)

(52) U.S. Cl.
CPC ............ *C09D 11/54* (2013.01); *B41J 2/2107* (2013.01); *B41J 3/4078* (2013.01);
(Continued)

(58) Field of Classification Search
CPC .... B41J 2/1433; B41J 2/1623; B41J 2202/00; B41J 2202/03; B41J 2/14201; B41J 2/045;
(Continued)

(56) References Cited

U.S. PATENT DOCUMENTS 5,672,198 A * 9/1997 Belmont ................. C04B 35/63
106/31.75
5,750,594 A * 5/1998 Page ...................... C09D 11/40
523/161
(Continued)

FOREIGN PATENT DOCUMENTS

WO    2016104248    6/2016
WO    2017068315    4/2017

OTHER PUBLICATIONS

International Search Report dated Jan. 10, 2019 for PCT/US2018/027755, Applicant Hewlett-Packard Development Company, L.P.

*Primary Examiner* — Manish S Shah
(74) *Attorney, Agent, or Firm* — Thorpe North & Western LLP (57) ABSTRACT

A fluid set can include an ink composition having a pH from pH 7 to pH 10 and a crosslinker composition having a basic pH from pH 8 to pH 10. The ink composition can include from 60 wt % to 90 wt % water, from 5 wt % to 30 wt % organic co-solvent, from 1 wt % to 6 wt % pigment, and a latex polymer including an aromatic (meth)acrylate moiety. The crosslinker composition can include from 70 wt % to 95 wt % water, from 1 wt % to 25 wt % organic co-solvent, and from 1 wt % to 10 wt % polycarbodiimide.

16 Claims, 2 Drawing Sheets

(51) Int. Cl.
*B41M 5/00* (2006.01)
*C09D 11/107* (2014.01)
*C09D 11/322* (2014.01)
*D06P 1/00* (2006.01)
*D06P 5/00* (2006.01)
*D06P 5/30* (2006.01)
*B41J 2/21* (2006.01)
*D06P 3/24* (2006.01)
*D06P 3/52* (2006.01)
*D06P 3/60* (2006.01)

(52) U.S. Cl.
CPC ......... *B41M 5/0023* (2013.01); *C09D 11/107* (2013.01); *C09D 11/322* (2013.01); *D06P 1/0052* (2013.01); *D06P 5/002* (2013.01); *D06P 5/30* (2013.01); *D06P 3/246* (2013.01); *D06P 3/526* (2013.01); *D06P 3/6075* (2013.01)

(58) Field of Classification Search
CPC .. B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 6,057,384 | A * | 5/2000 | Nguyen | C09B 67/0008 523/160 |
| 6,153,001 | A * | 11/2000 | Suzuki | C09D 11/322 106/31.65 |
| 7,425,062 | B2 | 9/2008 | Bauer | |
| 8,628,185 | B1 | 1/2014 | Hale et al. | |
| 2004/0063809 | A1* | 4/2004 | Fu | C09D 11/36 523/160 |
| 2005/0199152 | A1* | 9/2005 | Hale | B41J 2/315 101/491 |
| 2006/0098066 | A1* | 5/2006 | Bauer | C09D 11/30 347/100 |
| 2009/0226678 | A1 | 9/2009 | Yatake et al. | |
| 2011/0036257 | A1 | 2/2011 | Lawrence | |
| 2014/0036014 | A1* | 2/2014 | Mozel | B41J 2/2107 347/100 |
| 2015/0166803 | A1 | 6/2015 | Jhaveri et al. | |
| 2017/0145239 | A1 | 5/2017 | Mozel et al. | |

* cited by examiner

FLUID SETS

BACKGROUND

Inkjet printing has become a popular way of recording images on various media. Some of the reasons include low printer noise, variable content recording, capability of high speed recording, and multi-color recording. These advantages can be obtained at a relatively low price to consumers. As the popularity of inkjet printing increases, the types of use also increase providing demand for new ink compositions. In one example, textile printing can have various applications including the creation of signs, banners, artwork, apparel, wall coverings, window coverings, upholstery, pillows, blankets, flags, tote bags, clothing, etc. However, the permanence of printed ink on textiles can be an issue in some instances, such as when printing aqueous inks on a variety of fabric substrates.

DETAILED DESCRIPTION

Digital printing on fabrics can be carried out using ink compositions and crosslinker compositions printed in contact on a surface of the fabric. These compositions, in one example, can even be suitable for digital printing using thermal inkjet printing technology, which is typically a less expensive ejection technology than piezoelectric printing. Furthermore, the ink compositions can also have good stability, jetability, color gamut, optical density, washfastness (durability through fabric washing cycles when printed with the crosslinker compositions) on various fabrics, including both natural and/or synthetic fabrics.

In accordance with this, the present disclosure is drawn to a fluid set, including an ink composition having a pH from pH 7 to pH 10 and a crosslinker composition having a basic pH from pH 8 to pH 10. The ink composition can include from 60 wt % to 90 wt % water, from 5 wt % to 30 wt % organic co-solvent, from 1 wt % to 6 wt % pigment, and a latex polymer including an aromatic (meth)acrylate moiety. The crosslinker composition can include from 70 wt % to 95 wt % water, from 1 wt % to 25 wt % organic co-solvent, and from 1 wt % to 10 wt % polycarbodiimide. In one example, the latex polymer can have an acid number from 2 mg KOH/g to 40 mg KOH/g. In another example, the latex polymer can include (meth)acrylic acid moiety. In another example, the aromatic (meth)acrylate moiety can be selected from 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, naphthyl methacrylate, naphthyl acrylate, phenyl methacrylate, phenyl acrylate, or a combination thereof. In one example, the latex polymer can be devoid of styrene, or if present, can be present in the latex polymer up 4 mol %. The polycarbodiimide can be present in the crosslinker composition at from 1 wt % to 7 wt % and/or can have a weight average molecular weight of 1,500 Mw to 150,000 Mw. The polymer dispersant can be a styrene-acrylic polymer adsorbed at a surface of the pigment.

In another example, a textile printing system can include an ink composition having a pH from pH 7 to pH 10, a crosslinker composition having a basic pH from pH 8 to pH 10, and a fabric substrate. The ink composition can include from 60 wt % to 90 wt % water, from 5 wt % to 30 wt % organic co-solvent, from 1 wt % to 6 wt % pigment, and a latex polymer including an aromatic (meth)acrylate moiety. The crosslinker composition can include from 70 wt % to 95 wt % water, from 1 wt % to 25 wt % organic co-solvent, and from 1 wt % to 10 wt % polycarbodiimide. In one example, the latex polymer can further include a surface (meth)acrylic acid moiety. In further detail, the aromatic (meth)acrylate moiety can be selected from 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, naphthyl methacrylate, naphthyl acrylate, phenyl methacrylate, phenyl acrylate, or a combination thereof. The polycarbodiimide can be present in the crosslinker composition at from 1 wt % to 7 wt % and can have a weight average molecular weight of 1,500 Mw to 150,000 Mw.

In another example, a method of textile printing can include ejecting an ink composition having a pH from pH 7 to pH 10 on a fabric substrate, and separately ejecting a crosslinker composition having a basic pH from pH 8 to pH 10 onto the fabric substrate. The ink composition can include from 60 wt % to 90 wt % water, from 5 wt % to 30 wt % organic co-solvent, from 1 wt % to 6 wt % pigment, and a latex polymer including an aromatic (meth)acrylate moiety. The crosslinker composition can include from 70 wt % to 95 wt % water, from 1 wt % to 25 wt % organic co-solvent, and from 1 wt % to 10 wt % polycarbodiimide. The method can also include reacting a (meth)acrylic acid surface group of the latex polymer with the polycarbodiimide of the crosslinker composition on the fabric substrate. In one example, the fabric substrate can include nylon fibers, polyester fibers, cotton fibers, or a blend thereof. In another example, the method can include curing the ink composition contacted with the crosslinker composition on the fabric substrate at a temperature from 120° C. to 180° C. for from 1 to 5 minutes.

With respect to the fluid set, the textile printing system, and the method of textile printing described herein, the term "(meth)acrylate" or "(meth)acrylic acid" or the like refers to monomers, copolymerized monomers, polymeric moieties, etc., that can either be acrylate or methacrylate (or a combination of both), or acrylic acid or methacrylic acid (or a combination of both). Also, in some examples, the terms "(meth)acrylate" and "(meth)acrylic acid" can be used interchangeably, as acrylates and methacrylates are salts or esters of acrylic acid and methacrylic acid, respectively. Thus, mention of one compound over another can be a function of pH. As the pH of the ink composition in the present disclosure is from pH 7 to pH 10, and as the pH of the crosslinker composition is from pH 8 to pH 10, these groups may often be in the form of salted (meth)acrylates in equilibrium with the acid, depending on other factors, such as the pH of the fabric media substrate, relative concentrations of ink composition and crosslinker composition, relative pH levels, etc. Furthermore, even if the monomer used to form the polymer was in the form of a type of (meth) acrylic acid during preparation, pH modifications during preparation or subsequently when added to an ink composition can impact the nature of the moiety as well (acid form vs. salt form). Thus, a polymerized monomer or a moiety of a polymer described as (meth)acrylic acid or as (meth) acrylate should not be read so rigidly as to not consider relative pH levels and other general organic chemistry concepts.

In further detail, the term "alkyl" refers to methyl, ethyl, or aliphatic branched or unbranched carbon chains from C3 to C8, for example. Thus, as an example, a "phenoxylalkyl (meth)acrylate" indicates the presence of a phenoxyl group with a C1 to C8 alkyl group joining the phenoxy group to either an acrylic acid or a methacrylic acid moiety (or an acrylate or a methacrylate moiety).

When discussing the fluid set, the textile printing system, or the method of textile printing, each of these discussions can be considered applicable to other examples whether or not they are explicitly discussed in the context of that example. Thus, for example, in discussing a pigment related to the ink composition, such disclosure is also relevant to and directly supported in context of the textile printing system or the method of textile printing, and vice versa.

Figure 1:
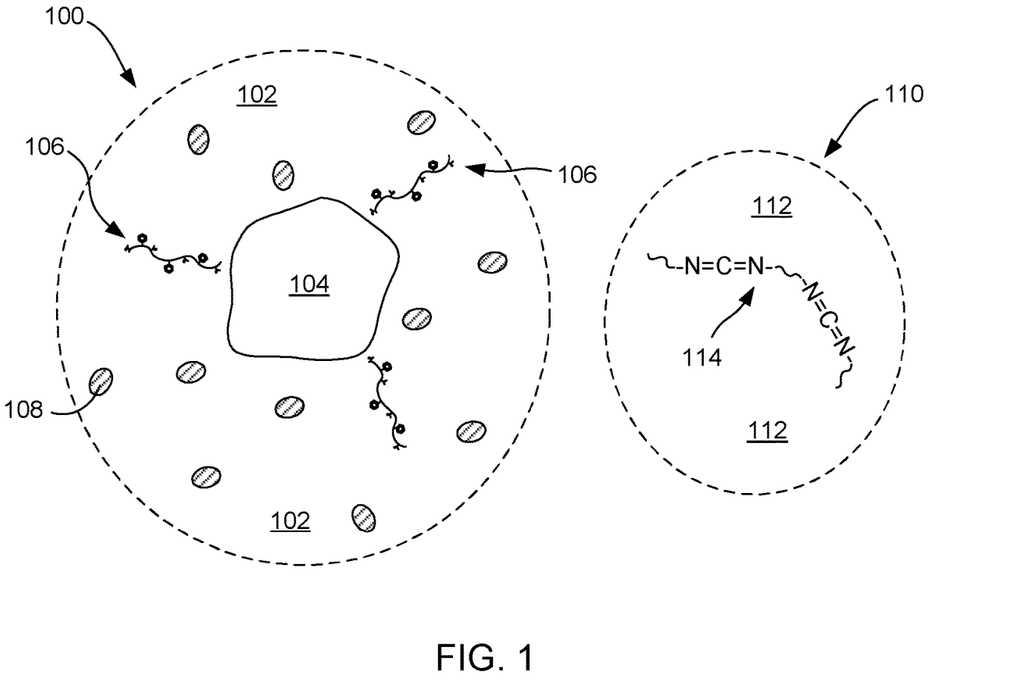
FIG. 1 schematically represents an example fluid set, including an ink composition and a crosslinker composition, in accordance with the present disclosure.

Turning now to FIG. 1, an ink composition 100 can include a liquid vehicle 102 (which can include water and organic co-solvent, for example) with from 1 wt % to 6 wt % pigment 104 (or pigment particles or solids) dispersed therein. In one example, the pigment can be dispersed by a polymer dispersant 106, such as a styrene-acrylic polymer dispersant, for example, adsorbed to a surface thereof. A latex polymer 108 can also be present, which can include an aromatic (meth)acrylate moiety. To be clear, reference to an "aromatic (meth)acrylate" does not include the copolymerization of two different monomers copolymerized together into a common polymer, e.g., styrene and methyl methacrylate. Rather, the term "aromatic (meth)acrylate" refers to a single aromatic monomer that is functionalized by an acrylate, methacrylate, acrylic acid, or methacrylic acid, etc. The "(meth)acrylate" group of any type can be directly attached to the aromatic structure or can be attached to the aromatic structure through a linkage group, e.g., an alkyl group (e.g., C1 to C8), an ether group (e.g., oxylalkyl, ethylene glycol, etc. group), or through some other linkage group. Furthermore, the aromatic group can be phenyl, benzyl, naphthyl, etc.

The pigment 102 can be any of a number of pigments of any of a number of primary or secondary colors, or can be black or white, for example. More specifically, colors can include cyan, magenta, yellow, red, blue, violet, red, orange, green, etc. In one example, the ink composition 100 can be a black ink with a carbon black pigment. In another example, the ink composition can be a cyan or green ink with a copper phthalocyanine pigment, e.g., Pigment Blue 15:0, Pigment Blue 15:1; Pigment Blue 15:3, Pigment Blue 15:4, Pigment Green 7, Pigment Green 36, etc. In another example, the ink composition can be a magenta ink with a quinacridone pigment or a co-crystal of quinacridone pigments. Example quinacridone pigments that can be utilized can include PR122, PR192, PR202, PR206, PR207, PR209, PO48, PO49, PV19, PV42, or the like. These pigments tend to be magenta, red, orange, violet, or other similar colors. In one example, the quinacridone pigment can be PR122, PR202, PV19, or a combination thereof. In another example, the ink composition can be a yellow ink with an azo pigment, e.g., Pigment Yellow 74 and Pigment Yellow 155. In one example, the pigment can include aromatic moieties.

The pigment can be dispersed by a polymer dispersant 106, such as a styrene (meth)acrylate dispersant, or another dispersant suitable for keeping the pigment 104 suspended in the liquid vehicle 102. For example, the dispersant can be any dispersing (meth)acrylate polymer, or other type of polymer, such as a styrene maleic acid copolymer. In one specific example, the (meth)acrylate polymer can be a styrene-acrylic type dispersant polymer, as it can promote π-stacking between the aromatic ring of the dispersant and various types of pigments, such as copper phthalocyanine pigments, for example. In one example, the styrene-acrylic dispersant can have a weight average molecular weight from 4,000 Mw to 30,000 Mw. In another example, the styrene-acrylic dispersant can have a weight average molecular weight of 8,000 Mw to 28,000 Mw, from 12,000 Mw to 25,000 Mw, from 15,000 Mw to 25,000 Mw, from 15,000 Mw to 20,000 Mw, or about 17,000 Mw. Regarding the acid number, the styrene-acrylic dispersant can have an acid number from 100 to 350, from 120 to 350, from 150 to 300, from 180 to 250, or about 214, for example. Example commercially available styrene-acrylic dispersants can include Joncryl® 671, Joncryl® 71, Joncryl® 96, Joncryl® 680, Joncryl® 683, Joncryl® 678, Joncryl® 690, Joncryl® 296, Joncryl® 671, Joncryl® 696 or Joncryl® ECO 675 (all available from BASF Corp., Germany).

In further detail, the ink compositions 100 can also include a latex polymer 108. The term "latex polymer" generally refers to any dispersed polymer prepared from acrylate and/or methacrylate monomers, including an aromatic (meth)acrylate monomer that results in aromatic (meth)acrylate moieties as part of the latex. In some examples, the latex particles can include a single heteropolymer that is homogenously copolymerized. In another example, a multi-phase latex polymer can be prepared that includes a first heteropolymer and a second heteropolymer. The two heteropolymers can be physically separated in the latex particles, such as in a core-shell configuration, a two-hemisphere configuration, smaller spheres of one phase distributed in a larger sphere of the other phase, interlocking strands of the two phases, and so on. If a two-phase polymer, the first heteropolymer phase can be polymerized from two or more aliphatic (meth)acrylate ester monomers or two or more aliphatic (meth)acrylamide monomers. The second heteropolymer phase can be polymerized from a cycloaliphatic monomer, such as a cycloaliphatic (meth)acrylate monomer or a cycloaliphatic (meth)acrylamide monomer. The first or second heteropolymer phase can include the aromatic (meth)acrylate monomer, e.g., phenyl, benzyl, naphthyl, etc. In one example, the aromatic (meth)acrylate monomer can be a phenoxylalkyl (meth)acrylate that forms a phenoxylalkyl (meth)acrylate moiety within the latex polymer, e.g. phenoxylether, phenoxylpropyl, etc. The second heteropolymer phase can have a higher $T_g$ than the first heteropolymer phase in one example. The first heteropolymer composition may be considered a soft polymer composition and the second heteropolymers composition may be considered a hard polymer composition. If a two-phase heteropolymer, the first heteropolymer composition can be present in the latex polymer in an amount ranging from about 15 wt % to about 70 wt % of a total weight of the polymer particle, and the second heteropolymer composition can be present in an amount ranging from about 30 wt % to about 85 wt % of the total weight of the polymer particle. In other examples, the first heteropolymer composition can be present in an amount ranging from about 30 wt % to about 40 wt % of a total weight of the polymer particle, and the second heteropolymer composition can be present in an amount ranging from about 60 wt % to about 70 wt % of the total weight of the polymer particle.

In more general terms, whether there is a single heteropolymer phase, or there are multiple heteropolymer phases, heteropolymer(s) or copolymer(s) can include a number of various types of copolymerized monomers, including aliphatic(meth)acrylate ester monomers, such as linear or branched aliphatic (meth)acrylate monomers, cycloaliphatic (meth)acrylate ester monomers, or aromatic monomers. However, in accordance with the present disclosure, the aromatic monomer(s) selected for use can include an aromatic (meth)acrylate monomer.

Examples of aromatic (meth)acrylate monomers that can be used in a heteropolymer or copolymer of the latex (single-phase, dual-phase in one or both phases, etc.) include 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, naphthyl methacrylate, naphthyl acrylate, phenyl methacrylate, phenyl acrylate, or a combination thereof. In one example, the latex polymer can include a phenoxylethyl acrylate and a phenoxylethyl methacrylate, or a combination of a phenoxylethyl acrylate and phenoxylethyl methacrylate.

Examples of the linear aliphatic (meth)acrylate monomers that can be used include ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, and combinations thereof.

Examples of the cycloaliphatic (meth)acrylate ester monomers can include cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof.

In further detail, in one example, the latex polymer can be prepared devoid of styrene, as styrene seems to have a negative impact stretchability of the latex polymer when printed and cured. If styrene is included, in one example, the styrene content can be limited to 4 mol %. When stretched, for example, color change due to elongation can occur, which can be determined using optical density data before and after stretch and calculating ΔE. This can occur whether the styrene is in a homogenous single-phase latex copolymer, or in one or both of the polymers of a two-phase latex polymer. On the other hand, when copolymerizing (meth) acrylate functionalized phenyl or benzyl (or other aromatic) monomers, such as the phenoxylethyl (meth)acrylates, 3-phenoxy-2-hydroxypropyl methacrylates, or benzyl methacrylates, etc., into the latex polymer, stretchability does not seem to be negatively impacted compared to copolymers with a similar molar concentration of copolymerized styrene. Again, if styrene is used, it may be desirable to use it in more limited quantities, e.g., less than about 4 mol % relative to the balance of the other monomers used. Notably, the same issues are not particularly relevant to the presence of styrene in the polymer dispersant 106 used to disperse the pigment.

In further detail, the weight average molecular weight of the latex polymer can be from 50,000 Mw to 500,000 Mw, for example. In other examples, the weight average molecular weight can be from 100,000 Mw to 400,000 Mw, or from 150,000 Mw to 300,000 Mw. The acid number of the latex polymer can be from 2 mg KOH/g to 40 mg KOH/g, from 2 mg KOH/g to 30 mg KOH/g, or 3 mg KOH/g to 26 mg KOH/g, or 4 mg KOH/g to 20 mg KOH/g, for example. The latex polymer can be present at a relatively high concentration, e.g., from 5 wt % to 20 wt %, from 6 wt % to 15 wt %, or from 7 wt % to 12 wt %, for example. As mentioned, the latex polymer can be in acid form, such as in the form of a polymer with (meth)acrylic acid surface groups, or may be in its salt form, such as in the form of a polymer with poly(meth)acrylate groups. However, as the ink compositions of the present disclosure can be formulated at a pH from pH 7 to pH 10, the (meth)acrylate groups may be more prevalent in the latex polymer, particularly at the surface thereof, though there will still be some (meth)acrylic acid groups in equilibrium even at basic pH levels. Acid groups can be present in one example, as they provide moieties for crosslinking with the crosslinker composition described herein. Suitable pH ranges for the ink composition can be from pH 7 to pH 10, from pH 7.2 to pH 10, from pH 7.5 to pH 10, from pH 8 to pH 10, 7 to pH 9, from pH 7.2 to pH 9, from pH 7.5 to pH 9, from pH 8 to pH 9, from 7 to pH 8.5, from pH 7.2 to pH 8.5, from pH 7.5 to pH 8.5, from pH 8 to pH 8.5, from 7 to pH 8, from pH 7.2 to pH 8, or from pH 7.5 to pH 8.

In further detail, the latex particles can be prepared by flowing multiple monomer streams into a reactor. An initiator can also be included in the reactor. The initiator may be selected from a persulfate, such as a metal persulfate or an ammonium persulfate. In some examples, the initiator may be selected from a sodium persulfate, ammonium persulfate or potassium persulfate. In further examples, the latex particles can have an average particle size ranging from 20 nm to 500 nm, from 50 nm to 350 nm, or from 150 nm to 300 nm. The particle size of any solids herein, including the average particle size of the dispersed polymer binder, can be determined using a Nanotrac® Wave device, from Microtrac, which measures particles size using dynamic light scattering. Average particle size can be determined using particle size distribution data generated by the Nanotrac® Wave device.

Returning now to FIG. 1, the ink compositions 100 of the present disclosure can be formulated to include an aqueous liquid vehicle 102, which can include the water content, e.g., 60 wt % to 90 wt % or from 75 wt % to 85 wt %, as well as organic co-solvent, e.g., from 4 wt % to 30 wt %, from 6 wt % to 20 wt %, or from 8 wt % to 15 wt %. Other liquid vehicle components can also be included, such as surfactant, antibacterial agent, other colorant, etc. However, as part of the ink composition, pigment, polymer dispersant, and the latex polymer can be included or carried by the liquid vehicle components.

In further detail regarding the aqueous liquid vehicle 102, co-solvent(s) can be present and can include any co-solvent or combination of co-solvents that is compatible with the pigment, dispersant, and polymer latex. Examples of suitable classes of co-solvents include polar solvents, such as alcohols, amides, esters, ketones, lactones, and ethers. In additional detail, solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, 2-ethyl-2-(hydroxymethyl)-1,3-propane diol (EPHD), glycerol, dimethyl sulfoxide, sulfolane, glycol ethers, alkyldiols such as 1,2-hexanediol, and/or ethoxylated glycerols such as LEG-1, etc.

The aqueous liquid vehicle can also include surfactant. In general, the surfactant can be water soluble and may include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, and mixtures thereof. In some examples, the surfactant can include a nonionic surfactant, such as a Surfynol® surfactant, e.g., Surfynol® 440 (from Evonik, Germany), or a Tergitol™ surfactant, e.g., Tergitol™ TMN-6 (from Dow Chemical, USA). In another example, the surfactant can include an anionic surfactant, such as a phosphate ester of a C10 to C20 alcohol or a polyethylene glycol (3) oleyl mono/di phosphate, e.g., Crodafos® N3A (from Croda International PLC, United Kingdom). The surfactant or combinations of surfactants, if present, can be included in the ink composition at from about 0.01 wt % to about 5 wt % and, in some examples, can be present at from about 0.05 wt % to about 3 wt % of the ink compositions.

Consistent with the formulations of the present disclosure, various other additives may be included to provide desired properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Acticide®, e.g., Acticide® B20 (Thor Specialties Inc.), Nuosept™ (Nudex, Inc.), Ucarcide™ (Union carbide Corp.), Vancide® (R.T. Vanderbilt Co.), Proxel™ (ICI America), and combinations thereof. Sequestering agents such as EDTA (ethylene diamine tetra acetic acid) may be included to eliminate the deleterious effects of heavy metal impurities, and buffer solutions may be used to control the pH of the ink. Viscosity modifiers and buffers may also be present, as well as other additives to modify properties of the ink as desired.

As also shown in FIG. 1, a crosslinker composition 110 is also shown, which can include a polycarbodiimide 114 dispersed in a liquid vehicle 112. Notably, the liquid vehicle in the ink composition and the liquid vehicle in the crosslinker composition are not typically the same liquid vehicle formulation, but can have common ingredients, such as water, for example. Both can also include an organic co-solvent (that may or may not be the same selected co-solvent(s)). Thus, the discussion of the liquid vehicle described herein related to the ink composition is also relevant to the liquid vehicle of the crosslinker composition, and the same types of liquid vehicle components can be independently selected for use in the crosslinker composition.

With specific reference to the polycarbodiimide 114 that is present in the crosslinker composition 110, FIG. 1 presents a representative simplified schematic formula for illustrative purposes only. The polycarbodiimide selected for use can be any of a number of polycarbodiimides with two or more carbodiimide groups. Thus, when the crosslinker composition is printed on the fabric media substrate (not shown in FIG. 1, but shown in FIG. 2), the (meth)acrylic acid group(s) (such as provided by the aromatic (meth)acrylate moieties or other (meth)acrylates that may be present at a surface of the polymer latex in the ink composition), the polycarbodiimide in the crosslinker composition, and in some instances, the surface of the fabric media substrate can interact to generate a high quality image that exhibits durable washfastness as demonstrated in the examples hereinafter. The polycarbodiimide can be present in the crosslinker composition at from 1 wt % to 7 wt %, from 2 wt % to 7 wt %, from 2 wt % to 6 wt %, from 3 wt % to 7 wt %, or from 3 wt % to 6 wt %, for example. In some example, the polycarbodiimide can have a weight average molecular weight of 1,500 Mw to 150,000 Mw, from 2,000 Mw to 100,000 Mw, or from 5,000 Mw to 75,000 Mw.

A non-limiting but illustrative example reaction between i) a carboxylic acid group, such as can be present on a surface of the latex polymer (also in salt and/or ester form in equilibrium), and ii) a carbodiimide group, such as can be present on a polycarbodiimide, is shown as Formula I, as follows:

Formula I

In Formula I, the asterisks (*) represent portions of the various organic compounds that are not part of the reaction shown in Formula I, and are thus not shown, but could be any of a number of organic groups or functional moieties, for example.

In this example, the pH of the ink composition that includes the carboxyl group on latex polymer can be from pH 7 to pH 10, and the pH of the crosslinker composition that is contacted (e.g., overprinted or underprinted) with the ink composition on the fabric substrate can be from pH 8 to pH 10. At these pH levels, there can still be some of the (meth)acrylate groups in the acid form, although there may not be very much present in equilibrium as the pH gets toward the higher end of the range. That being stated, the presence of the acid form of an acrylic, even within this pH range, can crosslink as shown in Formula I.

In further detail, in accordance with examples of the present disclosure, the polycarbodiimides present in the crosslinker composition can interact with the latex polymer, acting to cause the (meth)acrylate (or (meth)acrylic acid) group of the polymer binder to form an amide linkage, as shown in Formula I above. Other types of reactions can also occur, but Formula I is provided by way of example to illustrate one type of reaction that can occur when the ink composition comes into contact with the crosslinker composition, e.g., interaction or reaction with the substrate, interaction or reaction between different types of latex polymer and/or different types of polycarbodiimides, interactions or reactions with different molar ratios (other than 1:1, for example) than that shown in Formula I, etc.

Figure 2:
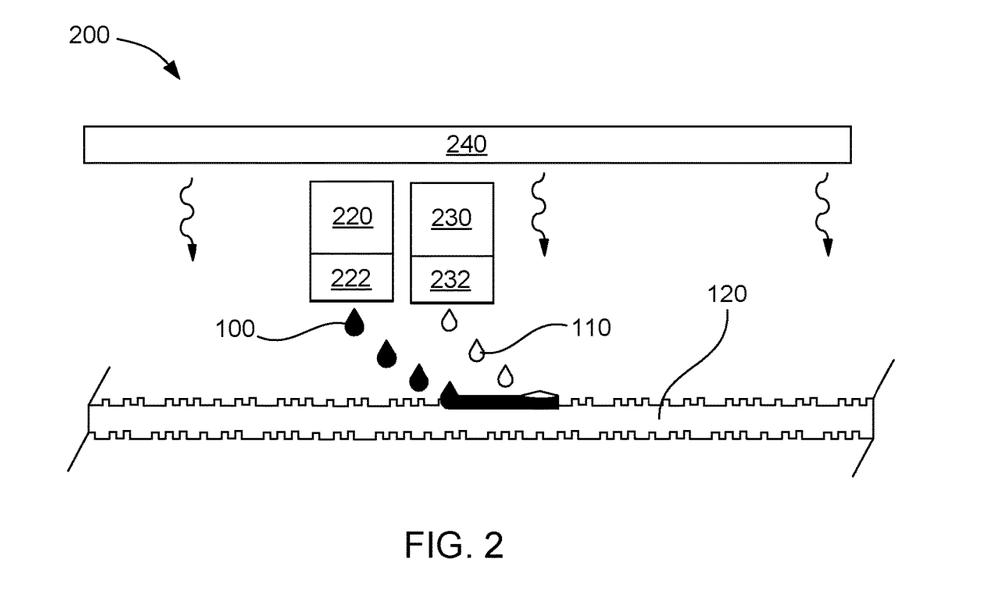
FIG. 2 schematically depicts an example textile printing system that includes an ink composition, a crosslinker composition, and a synthetic fabric substrate.

As shown in FIG. 2, a textile printing system 200 is shown schematically and can include an ink composition 100 for printing on a fabric substrate 120. For example, the ink composition can be printed from an inkjet pen 220 which includes an ejector 222, such as a thermal inkjet ejector. These ink compositions can be suitable for printing on many types of textiles, but can be particularly acceptable for printing on both natural and/or synthetic fabric substrate. Thus, this fluid set is versatile, as some printing systems that perform well on natural fabrics can perform less favorably on some types of synthetic fabric, and vice versa.

Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources (e.g. cornstarch, tapioca products, sugarcanes), etc. Example synthetic fibers used in the fabric substrates can include polymeric fibers such as, nylon fibers, polyvinyl chloride (PVC) fibers, PVC-free fibers made of polyester, polyamide, polyimide, polyacrylic, polypropylene, polyethylene, polyurethane, polystyrene, polyaramid (e.g., Kevlar®) polytetrafluoroethylene (Teflon®) (both trademarks of E. I. du Pont de Nemours Company, Delaware), fiberglass, polytrimethylene, polycarbonate, polyethylene terephthalate, polyester terephthalate, polybutylene terephthalate, or a combination thereof. In some examples, the fiber can be a modified fiber from the above-listed polymers. The term "modified fiber" refers to one or both of the polymeric fiber and the fabric as a whole having undergone a chemical or physical process such as, but not limited to, a copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation.

The fabric substrate can be in one of many different forms, including, for example, a textile, a cloth, a fabric material, fabric clothing, or other fabric product suitable for applying ink, and the fabric substrate can have any of a number of fabric structures. The term "fabric structure" is intended to include structures that can have warp and weft, and/or can be woven, non-woven, knitted, tufted, crocheted, knotted, and pressured, for example. The terms "warp" and "weft" have their ordinary meaning in the textile arts, as used herein, e.g., warp refers to lengthwise or longitudinal yarns on a loom, while weft refers to crosswise or transverse yarns on a loom.

It is notable that the term "fabric substrate" or "fabric media substrate" does not include materials commonly known as any kind of paper (even though paper can include multiple types of natural and synthetic fibers or mixtures of both types of fibers). Fabric substrates can include textiles in filament form, textiles in the form of fabric material, or textiles in the form of fabric that has been crafted into a finished article (e.g. clothing, blankets, tablecloths, napkins, towels, bedding material, curtains, carpet, handbags, shoes, banners, signs, flags, etc.). In some examples, the fabric substrate can have a woven, knitted, non-woven, or tufted fabric structure. In one example, the fabric substrate can be a woven fabric where warp yarns and weft yarns can be mutually positioned at an angle of about 90°. This woven fabric can include but is not limited to, fabric with a plain weave structure, fabric with twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are one or both bonded together and interlocked together by a chemical treatment process (e.g., a solvent treatment), a mechanical treatment process (e.g., embossing), a thermal treatment process, or a combination of two or more of these processes.

As previously mentioned, the fabric substrate can be a combination of fiber types, e.g. a combination of any natural fiber with another natural fiber, any natural fiber with a synthetic fiber, a synthetic fiber with another synthetic fiber, or mixtures of multiple types of natural fibers and/or synthetic fibers in any of the above combinations. In some examples, the fabric substrate can include natural fiber and synthetic fiber. The amount of each fiber type can vary. For example, the amount of the natural fiber can vary from about 5 wt % to about 95 wt % and the amount of synthetic fiber can range from about 5 wt % to 95 wt %. In yet another example, the amount of the natural fiber can vary from about 10 wt % to 80 wt % and the synthetic fiber can be present from about 20 wt % to about 90 wt %. In other examples, the amount of the natural fiber can be about 10 wt % to 90 wt % and the amount of synthetic fiber can also be about 10 wt % to about 90 wt %. Likewise, the ratio of natural fiber to synthetic fiber in the fabric substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa.

In one example, the fabric substrate can have a basis weight ranging from about 10 gsm to about 500 gsm. In another example, the fabric substrate can have a basis weight ranging from about 50 gsm to about 400 gsm. In other examples, the fabric substrate can have a basis weight ranging from about 100 gsm to about 300 gsm, from about 75 gsm to about 250 gsm, from about 125 gsm to about 300 gsm, or from about 150 gsm to about 350 gsm.

In addition, the fabric substrate can contain additives including, but not limited to, colorant (e.g., pigments, dyes, and tints), antistatic agents, brightening agents, nucleating agents, antioxidants, UV stabilizers, fillers and lubricants, for example. Alternatively, the fabric substrate may be pre-treated in a solution containing the substances listed above before applying other treatments or coating layers.

Regardless of the substrate, whether natural, synthetic, blend thereof, treated, untreated, etc., the fabric substrates printed with the fluid sets of the present disclosure can provide acceptable optical density (OD) and/or washfastness properties, and can also exhibit stretchability properties that do not particularly impact the image quality of the printed and cured image. The term "washfastness" can be defined as the OD that is retained or delta E (ΔE) after five (5) standard washing machine cycles using warm water and a standard clothing detergent (e.g., Tide® available from Proctor and Gamble, Cincinnati, Ohio, USA). Essentially, by measuring OD and/or L*a*b* both before and after washing, ΔOD and ΔE value can be determined, which is essentially a quantitative way of expressing the difference between the OD and/or L*a*b* prior to and after undergoing the washing cycles. Thus, the lower the ΔOD and ΔE values, the better. In further detail, ΔE is a single number that represents the "distance" between two colors, which in accordance with the present disclosure, is the color (or black) prior to washing and the modified color (or modified black) after washing.

Colors, for example, can be expressed as CIELAB values. It is noted that color differences may not be symmetrical going in both directions (pre-washing to post washing vs. post-washing to pre-washing). Using the CIE 1976 definition, the color difference can be measured and the ΔE value calculated based on subtracting the pre-washing color values of L*, a*, and b* from the post-washing color values of L*, a*, and b*. Those values can then be squared, and then a square root of the sum can be determined to arrive at the ΔE value. The 1976 standard can be referred to herein as "$\Delta E_{CIE}$." The CIE definition was modified in 1994 to address some perceptual non-uniformities, retaining the L*a*b* color space, but modifying to define the L*a*b* color space with differences in lightness (L*), chroma (C*), and hue (h*) calculated from L*a*b* coordinates. Then in 2000, the CIEDE standard was established to further resolve the perceptual non-uniformities by adding five corrections, namely i) hue rotation ($R_T$) to deal with the problematic blue region at hue angles of about 275°), ii) compensation for neutral colors or the primed values in the L*C*h differences, iii) compensation for lightness ($S_L$), iv) compensation for chroma ($S_c$), and v) compensation for hue ($S_H$). The 2000 modification can be referred to herein as "$\Delta E_{2000}$." In accordance with examples of the present disclosure, ΔE value can be determined using the CIE definition established in 1976, 1994, and 2000 to demonstrate washfastness. However, in the examples of the present disclosure, $\Delta E_{CIE}$ and $\Delta E_{2000}$ are used.

In further detail, the textile printing system 200 can include a crosslinker composition 110, which can include a polycarbodiimide dispersed in a liquid vehicle, as previously mentioned. The crosslinker composition can be printed from a fluidjet pen 230 which includes an ejector 232, such as a fluid ejector which can also be a thermal inkjet ejector. As mentioned, in one example, the polycarbodiimide of the crosslinker composition can interact with the latex polymer (of the ink composition 100) and can form an amide linkage. In some examples, a curing device 240 can be used to apply heat to the printed fabric substrate to cure the ink composition, e.g., causing the crosslinking reaction to occur or accelerate. Heat can be applied using forced hot air, a heating lamp, an oven, or the like. Curing the ink composition contacted with the crosslinker composition on the fabric substrate can occur at a temperature from 120° C. to 180° C. for from 1 to 5 minutes, or from 130° C. to 150° C. for from 2 to 4 minutes.

Figure 3:
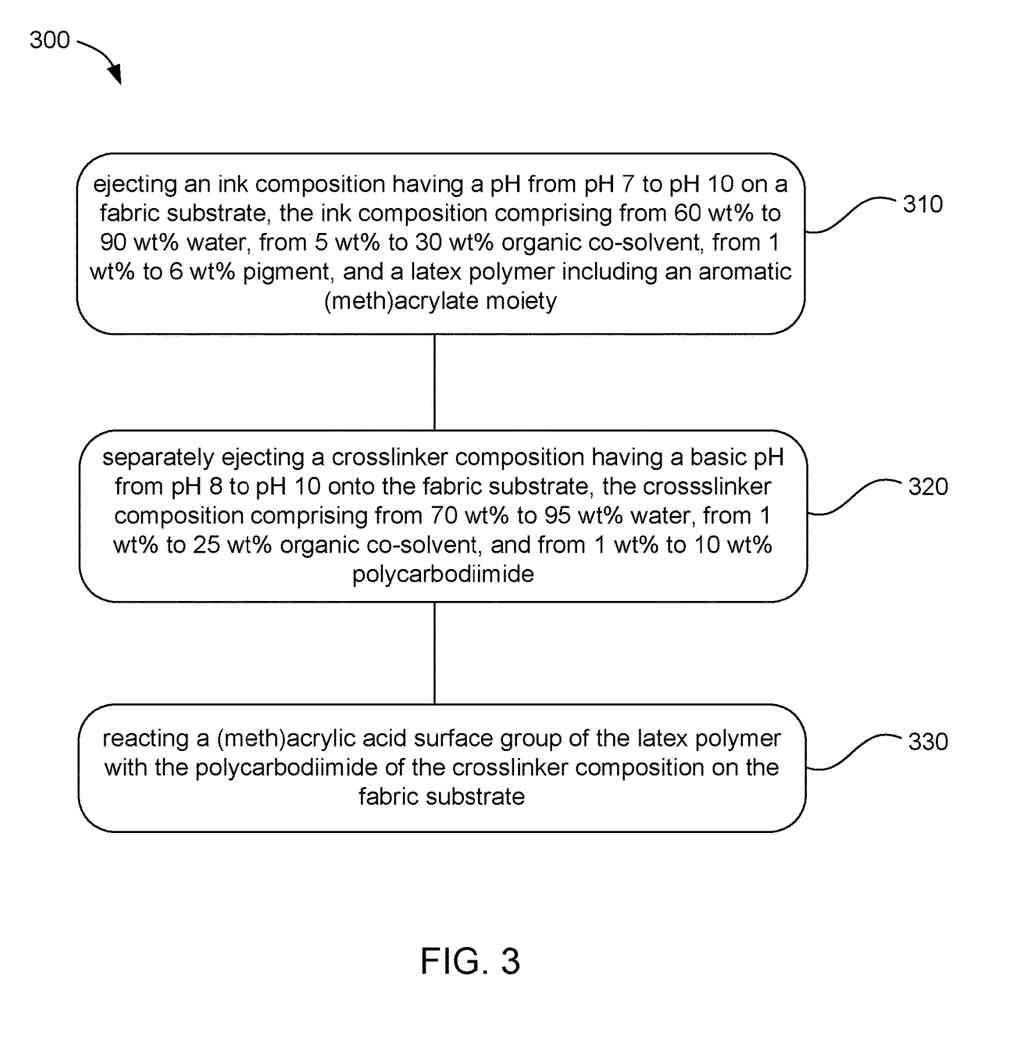
FIG. 3 depicts an example method of textile printing in accordance with the present disclosure.

In another example, and as set forth in FIG. 3, a method 300 of textile printing can include ejecting 310 an ink composition having a pH from pH 7 to pH 10 on a fabric substrate. The ink composition can include from 60 wt % to 90 wt % water, from 5 wt % to 30 wt % organic co-solvent, from 1 wt % to 6 wt % pigment, and a latex polymer including an aromatic (meth)acrylate moiety. The method can also include separately ejecting 320 a crosslinker composition having a basic pH from pH 8 to pH 10 onto the fabric substrate. The crosslinker composition can include from 70 wt % to 95 wt % water, from 1 wt % to 25 wt % organic co-solvent, and from 1 wt % to 10 wt % polycarbodiimide. In further detail, the method can include reacting 330 a (meth)acrylic acid surface group of the latex polymer with the polycarbodiimide of the crosslinker composition on the fabric substrate. As a note, the "(meth)acrylic acid surface group" can be from any of a number of copolymerized monomers, including acrylic acid, methacrylic acid, an aromatic acrylic acid, an aromatic methacrylic acid, an alicyclic acrylic acid, an alicyclic methacrylic acid, etc., or any other copolymerized monomer or moiety that includes an available acid group for crosslinking. In one example, the fabric substrate can include nylon fibers, polyester fibers, cotton fibers, or a blend thereof. In another example, the method can include curing the ink composition contacted with the crosslinker composition on the fabric substrate at a temperature from 120° C. to 180° C. for from 1 to 5 minutes.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint.

The term "acid value" or "add number" refers to the mass of potassium hydroxide (KOH) in milligrams that can be used to neutralize one gram of substance (mg KOH/g), such as the latex polymers disclosed herein. This value can be determined, in one example, by dissolving or dispersing a known quantity of a material in organic solvent and then titrating with a solution of potassium hydroxide (KOH) of known concentration for measurement. Acid number values or ranges can be shown either with or without notating the specific units, e.g., mg KOH/g.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following are examples or illustrative of the technology. Numerous modifications and alternative methods may be devised without departing from the present disclosure. The appended claims are intended to cover such modifications and arrangements. Thus, while the technology has been described above with particularity, the following provides further detail in connection with what are presently deemed to be the acceptable examples.

Example 1—Preparation of Ink Compositions

Four ink compositions were prepared in accordance with the general formulation shown in Table 1A, namely a Black (K) Ink, a Cyan (C) Ink, a Magenta (M) Ink, and a Yellow (Y) Ink. A Comparative Ink Composition was also prepared, as shown in Table 1B, as follows:

TABLE 1A

Ink Compositions

| Ink ID | Category | Black (K) Ink (Wt %) | Cyan (C) Ink (Wt %) | Magenta (M) Ink (Wt %) | Yellow (Y) Ink (Wt %) |
|---|---|---|---|---|---|
| Black Pigment | Pigment Dispersed by Styrene-acrylic Polymer Acid Number 214 17,250 Mw | 2.65 | — | — | — |
| Cyan Pigment | Pigment Dispersed by Styrene-acrylic Polymer Acid Number 214 17,250 Mw | — | 1.68 | — | — |
| Magenta Pigment | Pigment Dispersed by Styrene-acrylic Polymer Acid Number 172 10,000 Mw | — | — | 3.34 | — |
| Yellow Pigment | Pigment dispersed by Styrene-acrylic Polymer Acid Number 165 8,000 Mw | — | — | — | 3.65 |
| [1]Latex Polymer (solids content) | Dispersed polymer binder | 10 | 10 | 10 | 10 |
| 1,2-butanediol | Organic Cosolvent | 18 | 18 | 18 | 18 |
| 2-pyrrolidone | Organic Cosolvent | 3 | 3 | 3 | 3 |
| [2]Dowanol ® TPM | Organic Cosolvent | 2 | 2 | 2 | 2 |
| [3]Crodafos ® O3A | Surfactant | 0.5 | 0.35 | 0.35 | 0.35 |
| [4]Tergitol ® 15-S-7 | Surfactant | 0.2 | 0.2 | 0.2 | 0.2 |
| [5]Capstone ® FS-35 | Nonionic Fluorosurfactant | 0.4 | 0.4 | 0.4 | 0.4 |
| Deionized Water | Water | Balance | Balance | Balance | Balance |
| pH adjusted using KOH to: | | 8.5 | 8.5 | 8.5 | 8.5 |

TABLE 1B

Comparative Ink Composition

| Ink ID | Category | Comparative (M Comp.) Ink (Wt %) |
|---|---|---|
| Magenta Pigment | Pigment Dispersed by Styrene-acrylic Polymer Acid Number 172 10,000 Mw | 2.0 |
| [6]Jantex ® 924 | Styrene butyl acrylic polymer binder 320,000 Mw; Acid Number 17.4 | 6 |
| Glycerol | Organic Cosolvent | 8 |
| LEG-1 | Organic Cosolvent | 1 |
| [3]Crodafos ® N3A | Surfactant | 0.5 |
| [7]Surfynol ® 440 (Surfactant) | Surfactant | 0.3 |
| [8]Acticide ® B20 | Biocide | 0.2 |
| Deionized Water | | Balance |
| pH adjusted using KOH | | 8.5 |

In Tables 1A and 1B above:

[1]Two heteropolymer phases: Phase-one included methyl methacrylate, butyl acrylate, and methacrylic acid; Phase-two included cyclohexyl methacrylate, cyclohexyl acrylate, phenoxylethyl methacrylate, and methacrylic acid. Particle size: 0.215 μm (particle size determined using Microtrac Nanotrac Wave II).
[2]Dowanol ® is a tripropylene glycol methyl ether available from Dow Chemical (USA).
[3]Crodafos ™ is available from Croda ® International Plc. (Great Britain).
[4]Teraitol ® is available from Dow Chemical (USA).
[5]Capstone ® is available from Du Pont (USA).
[6]Jantex ™ is available from Jantex Inks, (USA).
[7]Surfynol ® is available from Evonik, (Germany)
[8]Acticide ® is available from Thor Specialties, Inc. (USA).

Example 2—Preparation of Crosslinker Composition

A crosslinker composition, identified in Table 2 as Crosslinker (XL), was prepared, as follows:

TABLE 2

| Crosslinker ID | Crosslinker 1 (XL1) | Crosslinker 2 (XL2) |
|---|---|---|
| 2-pyrrolidinone (Organic co-solvent) | 10 wt % | 10 wt % |
| [7]Surfynol ® 440 (Surfactant) | 0.4 wt % | 0.4 wt % |
| [9]Versatex ™ Fixer (as is) | 15 wt % (2 wt % active) | — |
| [10]Desmodur ™ XP 2802 (as is) | — | 15 wt % (6 wt % active) |
| Water | balance | Balance |
| pH (not adjusted) | 9.4 | 8.7 |

[7]Surfynol ® is available from Evonik, (Germany).

[9]Versatex ™ Fixer (as is) includes 13.5 wt % polycarbodiimide and is available from Jacquard Products (USA).

[10]Desmodur is XP 2802 includes 40 wt % polycarbodiimide and is available from Covestro (USA).

Example 3—Washfastness

The four (4) ink compositions (Table 1 K, C, M, and Y) of Example 1 (Table 1A) were printed respectively on four different fabric substrates, namely cotton, cotton/polyester blend, polyester, and nylon, with two different crosslinker compositions (XL1 and XL2) shown in Table 2 as well as without the use of crosslinker composition. Additionally, for comparative purposes, a Comparative Ink composition (Table 1B) was printed on the more challenging substrate, namely nylon, with and without crosslinker composition (with XL1 and without XL1). In printing the various ink composition samples, 3 drops per pixel (600 dpi) durability plots, where an individual drop was about 12 ng, were printed from a thermal inkjet printhead. The crosslinker composition, when applied, was overprinted with respect to the ink composition at 1 drop per pixel (12 ng per drop and 600 dpi), also from a thermal inkjet printhead. After printing, the printed fabric samples were allowed to dry and then cured under heat (150° C. for 3 minutes). The various samples (12 printed fabric samples, eight with crosslinker and four without crosslinker; plus two additional comparative samples, one with crosslinker and one without crosslinker) were then evaluated to obtain optical density (OD) and L*a*b* color space values, which represented the "pre-washing" values, or reference black or color values. Then, the printed fabric samples were washed at 40° C. with laundry detergent (e.g., Tide® available from Proctor and Gamble, Cincinnati, Ohio, USA) for 5 cycles, air drying the printed fabric substrates between each washing cycle. After the five cycles, optical density (OD) and L*a*b* values were measured for comparison, and delta E ($\Delta E$) values were calculated using the 1976 standard denoted as $\Delta E_{CIE}$ as well as the 2000 standard denoted as $\Delta E_{2000}$. The data is shown in Table 3A-3D below. The comparative data for an alternative ink is shown in Table 4 below as well.

TABLE 3A

K, C, M, Y Ink; Gray Cotton Fabric Substrate; with/without Crosslinker Composition XL1 or XL2

| Ink ID | Crosslinker ID | OD (Pre-wash) | OD (5 washes) | % $\Delta$OD | $\Delta E_{CIE}$ | $\Delta E_{2000}$ |
|---|---|---|---|---|---|---|
| K | XL1 | 0.945 | 0.904 | −4.4 | 1.26 | 1.14 |
| C | | 0.845 | 0.824 | −2.5 | 1.97 | 1.17 |
| M | | 0.840 | 0.802 | −4.5 | 2.56 | 1.07 |
| Y | | 0.904 | 0.868 | −4.0 | 2.24 | 0.55 |
| K | XL2 | 1.028 | 1.008 | −1.9 | 0.70 | 0.60 |
| C | | 0.936 | 0.929 | −0.7 | 0.71 | 0.29 |
| M | | 0.916 | 0.896 | −2.1 | 1.24 | 0.45 |
| Y | | 0.873 | 0.845 | −3.2 | 1.92 | 0.54 |
| K | None | 1.068 | 0.911 | −14.7 | 7.34 | 6.35 |
| C | | 0.978 | 0.858 | −12.2 | 5.49 | 3.36 |
| M | | 0.941 | 0.831 | −11.7 | 6.30 | 2.96 |
| Y | | 0.919 | 0.781 | −15.0 | 8.30 | 2.00 |

TABLE 3B

K, C, M, Y Ink; Cotton/Polyester blend Fabric Substrate; with/without Crosslinker Composition XL1 or XL2

| Ink ID | Crosslinker ID | OD (Pre-wash) | OD (5 washes) | % $\Delta$OD | $\Delta E_{CIE}$ | $\Delta E_{2000}$ |
|---|---|---|---|---|---|---|
| K | XL1 | 0.998 | 0.905 | −9.4 | 4.11 | 3.63 |
| C | | 0.908 | 0.823 | −9.4 | 3.30 | 2.24 |
| M | | 0.897 | 0.831 | −7.4 | 4.49 | 2.42 |
| Y | | 0.849 | 0.759 | −10.7 | 6.35 | 1.62 |
| K | XL2 | 0.988 | 0.936 | −5.3 | 2.09 | 1.84 |
| C | | 0.900 | 0.858 | −4.7 | 1.17 | 0.87 |
| M | | 0.906 | 0.849 | −6.2 | 3.61 | 1.85 |
| Y | | 0.801 | 0.733 | −8.6 | 5.42 | 1.42 |
| K | None | 1.063 | 0.893 | −16.0 | 8.21 | 7.17 |
| C | | 0.935 | 0.789 | −15.6 | 5.94 | 4.00 |
| M | | 0.963 | 0.817 | −15.2 | 6.59 | 3.47 |
| Y | | 0.889 | 0.730 | −17.8 | 10.83 | 2.69 |

TABLE 3C

K, C, M, Y Ink; Polyester Fabric Substrate; with/without Crosslinker Composition XL1 or XL2

| Ink ID | Crosslinker ID | OD (Pre-wash) | OD (5 washes) | % $\Delta$OD | $\Delta E_{CIE}$ | $\Delta E_{2000}$ |
|---|---|---|---|---|---|---|
| K | XL1 | 1.173 | 1.041 | −11.2 | 4.41 | 3.56 |
| C | | 1.022 | 0.919 | −10.1 | 4.74 | 3.22 |
| M | | 1.025 | 0.878 | −14.3 | 6.10 | 3.69 |
| Y | | 1.117 | 0.984 | −12.0 | 5.91 | 1.33 |
| K | XL2 | 1.189 | 1.086 | −8.7 | 3.73 | 2.98 |
| C | | 1.095 | 1.011 | −7.7 | 3.71 | 2.49 |
| M | | 1.101 | 1.012 | −8.1 | 3.51 | 2.04 |
| Y | | 1.082 | 1.008 | −6.9 | 4.47 | 1.02 |
| K | None | 1.218 | 0.982 | −19.4 | 9.51 | 7.79 |
| C | | 1.083 | 0.871 | −19.5 | 8.99 | 5.79 |
| M | | 1.102 | 0.797 | −27.7 | 12.39 | 6.92 |
| Y | | 1.079 | 0.834 | −22.8 | 13.87 | 3.24 |

TABLE 3D

K, C, M, Y Ink; Nylon Fabric Substrate; with/without Crosslinker Composition XL1 or XL2

| Ink ID | Crosslinker ID | OD (Pre-wash) | OD (5 washes) | % ΔOD | $\Delta E_{CIE}$ | $\Delta E_{2000}$ |
|---|---|---|---|---|---|---|
| K | XL1 | 1.219 | 1.000 | −18.0 | 8.71 | 7.13 |
| C |  | 1.094 | 0.868 | −20.7 | 12.03 | 8.59 |
| M |  | 1.136 | 0.877 | −22.8 | 9.91 | 6.08 |
| Y |  | 1.056 | 0.808 | −23.5 | 13.68 | 3.32 |
| K | XL2 | 1.223 | 1.123 | −8.1 | 3.60 | 2.86 |
| C |  | 1.090 | 0.982 | −9.9 | 6.79 | 5.02 |
| M |  | 1.107 | 0.960 | −13.3 | 9.29 | 6.04 |
| Y |  | 0.992 | 0.877 | −11.5 | 5.40 | 1.31 |
| K | None | 1.268 | 0.774 | −39.0 | 19.98 | 17.09 |
| C |  | 1.137 | 0.649 | −42.9 | 19.05 | 12.49 |
| M |  | 1.135 | 0.683 | −39.8 | 23.98 | 14.27 |
| Y |  | 1.061 | 0.629 | −40.7 | 29.31 | 7.30 |

TABLE 4

Comparative Ink (pH 8.5); Nylon Substrate; with/without Crosslinker XL1

| Ink ID | Crosslinker ID | OD (Pre-Wash) | OD (5 washes) | ΔOD | % ΔOD | $\Delta E_{CIE}$ |
|---|---|---|---|---|---|---|
| M Comp | — | 1.03 | 0.75 | −0.28 | −27.5 | 14.9 |
| M Comp | XL1 | 0.97 | 0.69 | −0.28 | −28.9 | 15.1 |

As can be seen in the data presented in Tables 3A-3D, acceptable washfastness was verified by comparing pre-wash optical density (OD) with post-wash OD and $\Delta E_{CIE}$ or $\Delta E_{2000}$ calculated from pre- and post-wash L*a*b* values. This was true for black as well as all three colors (CMY). Even with the nylon substrate, which exhibited very poor washfastness without the use of the polycarbodiimide crosslinker, washfastness still improved in most instances. Thus, the combination of the inks of Example 1 (KCMY) with a polycarbodiimide crosslinker printed thereon and cured has been shown to be a versatile fluid set and printing system that is useable across a wide variety of fabric types. On the other hand, as shown in Table 4, the magenta Comparative Ink having a pH of 8.5, which is the same as the pH of K, C, M, and Y inks, showed no washfastness improvement on nylon for either OD or $\Delta E_{CIE}$ when printed in combination with the crosslinker composition (XL1).

Example 4—Stretchability

Ink compositions prepared with latex polymer including copolymerized phenoxylethyl (meth)acrylate moieties have been shown to have acceptable print and durability properties, particularly when printed with aromatic pigments. In further detail, the presence of this type of aromatic (meth) acrylate moiety in a latex polymer can have the added benefit of promoting stretchability. Poor stretchability can lead to image cracking and a change in ΔE when the substrate on which the ink is printed is stretched, thereby diminishing durability and modification of color properties when stretched beyond its capacity. On the other hand, copolymerization of a latex polymer using a monomer that provides an aromatic (meth)acrylate moiety, such as phenoxylethyl acrylate moiety, a phenoxylethyl methacrylate moiety, or both, has been demonstrated to be stretchable to about 50% (in one direction) without cracking or any significant change to color value (ΔE). Conversely, similar latex polymer prepared with more than 4 mol % styrene failed this flexibility standard by changing in color value well before being stretched by 50%.

While the present technology has been described with reference to certain examples, various modifications, changes, omissions, and substitutions can be made without departing from the disclosure. It is intended, therefore, that the disclosure be limited only by the scope of the following claims.

What is claimed is:

1. A fluid set, comprising:
    an ink composition having a pH from pH 7 to pH 10, the ink composition, comprising:
        from 60 wt % to 90 wt % water,
        from 5 wt % to 30 wt % organic co-solvent,
        from 1 wt % to 6 wt % pigment,
        a polymer dispersant having a weight average molecular weight from 8,000 MW to 28,000 MW and an acid number from 100 to 350, and
        a latex polymer including an aromatic (meth)acrylate moiety and including from 0 mol % to 4 mol % styrene; and
    a crosslinker composition having a basic pH from pH 8 to pH 10, comprising:
        from 70 wt % to 95 wt % water,
        from 1 wt % to 25 wt % organic co-solvent, and
        from 1 wt % to 10 wt % polycarbodiimide.

2. The fluid set of claim 1, wherein the latex polymer has an acid number from 2 mg KOH/g to 40 mg KOH/g.

3. The fluid set of claim 1, wherein the latex polymer further includes a surface (meth)acrylic acid moiety.

4. The fluid set of claim 1, wherein the aromatic (meth) acrylate moiety is selected from 2-phenoxylethyl methacrylate, 2-phenoxylethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, naphthyl methacrylate, naphthyl acrylate, phenyl methacrylate, phenyl acrylate, or a combination thereof.

5. The fluid set of claim 1, wherein the polycarbodiimide is present in the crosslinker composition at from 1 wt % to 7 wt %.

6. The fluid set of claim 1, wherein the polycarbodiimide has a weight average molecular weight of 1,500 Mw to 150,000 Mw.

7. The fluid set of claim 1, further including a styrene-acrylic polymer adsorbed at a surface of the pigment as a polymer dispersant.

8. A textile printing system, comprising:
    an ink composition having a pH from pH 7 to pH 10, the ink composition, comprising:
        from 60 wt % to 90 wt % water,
        from 5 wt % to 30 wt % organic co-solvent;
        from 1 wt % to 6 wt % pigment,
        a polymer dispersant having a weight average molecular weight from 8,000 MW to 28,000 MW and an acid number from 100 to 350, and
        a latex polymer including an aromatic (meth)acrylate moiety and including from 0 mol % to 4 mol % styrene;
    a crosslinker composition having a basic pH from pH 8 to pH 10, comprising:
        from 70 wt % to 95 wt % water,
        from 1 wt % to 25 wt % organic co-solvent, and
        from 1 wt % to 10 wt % polycarbodiimide; and
    a fabric substrate.

9. The printing system of claim 8, wherein the latex polymer further includes a surface (meth)acrylic acid moiety.

10. The printing system of claim 8, wherein the aromatic (meth)acrylate moiety is selected from 2-phenoxylethyl methacrylate, 2-phenoxylethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2-hydroxy-3-phenoxypropyl acrylate, 2-hydroxy-3-phenoxypropyl methacrylate, naphthyl methacrylate, naphthyl acrylate, phenyl methacrylate, phenyl acrylate, or a combination thereof.

11. The printing system of claim 8, wherein the polycarbodiimide is present in the crosslinker composition at from 1 wt % to 7 wt % and has a weight average molecular weight of 1,500 Mw to 150,000 Mw.

12. A method of textile printing, comprising:

ejecting an ink composition having a pH from pH 7 to pH 10 on a fabric substrate, the ink composition comprising from 60 wt % to 90 wt % water, from 5 wt % to 30 wt % organic co-solvent, from 1 wt % to 6 wt % pigment, a polymer dispersant having a weight average molecular weight from 8,000 MW to 28,000 MW and an acid number from 100 to 350 and a latex polymer including an aromatic (meth)acrylate moiety and including from 0 mol % to 4 mol % styrene;

separately ejecting a crosslinker composition having a basic pH from pH 8 to pH 10 onto the fabric substrate, the crosslinker composition comprising from 70 wt % to 95 wt % water, from 1 wt % to 25 wt % organic co-solvent, and from 1 wt % to 10 wt % polycarbodiimide, and reacting a (meth)acrylic acid surface group of the latex polymer with the polycarbodiimide of the crosslinker composition on the fabric substrate.

13. The method of claim 12, wherein the fabric substrate includes nylon fibers, polyester fibers, cotton fibers, or a blend thereof.

14. The method of claim 12, further comprising curing the ink composition contacted with the crosslinker composition on the fabric substrate at a temperature from 120° C. to 180° C. for from 1 to 5 minutes.

15. The fluid set of claim 1, wherein the latex polymer is a heteropolymer and a configuration of the heteropolymer has a two-hemisphere configuration, smaller spheres of one phase distributed in a larger sphere of the other phase, or interlocking strands of the two phases.

16. The fluid set of claim 1, wherein the ink composition has a pH from 8.5 to 10.

* * * * *